United States Patent
Noda et al.

(10) Patent No.: US 8,589,021 B2
(45) Date of Patent: Nov. 19, 2013

(54) OPERATION CONTROL DEVICE

(75) Inventors: Hiroya Noda, Tokyo (JP); Sukeo Asahara, Tokyo (JP); Motoko Shimizu, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 146 days.

(21) Appl. No.: 13/141,999

(22) PCT Filed: Dec. 26, 2008

(86) PCT No.: PCT/JP2008/073822
§ 371 (c)(1),
(2), (4) Date: Jun. 24, 2011

(87) PCT Pub. No.: WO2010/073396
PCT Pub. Date: Jul. 1, 2010

(65) Prior Publication Data
US 2011/0257836 A1  Oct. 20, 2011

(51) Int. Cl.
*G06F 19/00*  (2011.01)
(52) U.S. Cl.
USPC .................................. 701/31.4; 701/3
(58) Field of Classification Search
USPC ................................... 701/13, 31.4
See application file for complete search history.

(56) References Cited

U.S. PATENT DOCUMENTS

| | | | | |
|---|---|---|---|---|
| 2004/0262409 | A1* | 12/2004 | Crippen et al. | 236/49.3 |
| 2010/0049381 | A1* | 2/2010 | Kaas et al. | 701/13 |
| 2010/0260374 | A1* | 10/2010 | Akashi et al. | 382/100 |

FOREIGN PATENT DOCUMENTS

| | | | |
|---|---|---|---|
| JP | 60-003543 | A | 1/1985 |
| JP | 61-27800 | A | 2/1986 |
| JP | 2-83423 | A | 3/1990 |
| JP | 2002-373181 | A | 12/2002 |
| JP | 2003-166850 | A | 6/2003 |
| JP | 2003-242184 | A | 8/2003 |
| JP | 2003-344327 | A | 12/2003 |

OTHER PUBLICATIONS

International Search Report (PCT/ISA/210) issued on Mar. 31, 2009, by Japanese Patent Office as the International Searching Authority for International Application No. PCT/JP2008/073822.
Written Opinion (PCT/ISA/237) issued on Mar. 31, 2009, by Japanese Patent Office as the International Searching Authority for International Application No. PCT/JP2008/073822.

(Continued)

*Primary Examiner* — Khoi Tran
*Assistant Examiner* — Robert Nguyen
(74) *Attorney, Agent, or Firm* — Buchanan Ingersoll & Rooney PC

(57) ABSTRACT

An operation control device includes: a database for storing generated heat amount conditions of a device provided in a satellite and temperature environment conditions based on an orbital position and attitude of the satellite; a thermal analysis condition generation unit for generating thermal analysis conditions on the basis of telemetry data transmitted from the satellite, the generated heat amount conditions, and the temperature environment conditions; an analysis unit for performing thermal analysis for computing a temperature inside the satellite on the basis of the thermal analysis conditions; a temperature distribution data generation unit for generating temperature distribution data of part or all inside the satellite in a three-dimensional display format on the basis of the temperature values obtained by the thermal analysis; and a display unit for displaying the temperature distribution data.

6 Claims, 3 Drawing Sheets

(56) References Cited

OTHER PUBLICATIONS

International Preliminary Examination Report (PCT/IPEA/409) issued on Jan. 28, 2011, by Japanese Patent Office as the International Examining Authority for International Application No. PCT/JP2008/073822.

Takatsugu Nomura et al., 1 H7 Development of the Evaluation and Analysis Program for the Thermal Control System of ETS-V, National Space Development Agency of Japan, 1987, pp. 298-299, with English translation.

Office Action from the Japan Patent Office dated Jan. 8, 2013, issued in corresponding Japanese Patent Application No. 2010-543728, with English translation thereof.

* cited by examiner

OPERATION CONTROL DEVICE

TECHNICAL FIELD

The present invention relates to an operation control device and particularly to an operation control device for grasp of the temperature state inside a satellite.

BACKGROUND ART

Conventionally, to know the temperature state of a satellite launched into space, telemetry data transmitted from the satellite is acquired (see Patent Literature 1).
Patent Literature 1: Japanese Patent Application Laid-open No. H2-083423

DISCLOSURE OF INVENTION

Problem to be Solved by the Invention

However, only the temperatures at fixed positions in a satellite can be obtained from the telemetry data transmitted from the satellite. To know the distribution of temperature, the operator of the satellite usually requests the design engineer etc. of the satellite to analyze the temperature distribution. One problem with this situation is that the operator of the satellite cannot grasp the temperature distribution of the satellite immediately. The delay in the grasp of the temperature distribution can cause another problem in that the discovery of a failure such as temperature anomaly is delayed.

The present invention has been made to solve the above problems, and it is an object of the invention to provide an operation control device that displays the temperature state inside a satellite as temperature distribution data in a three-dimensional display format to allow the operator of the satellite to grasp the three-dimensional temperature distribution inside the satellite easily and rapidly.

Means for Solving Problem

In order to solve the aforementioned problem and attain the aforementioned object, an operation control device according to one aspect of the present invention is constructed in such a manner as to include: a database for storing generated heat amount conditions of a device provided in a satellite and temperature environment conditions based on an orbital position and attitude of the satellite; a thermal analysis condition generation unit for generating thermal analysis conditions on the basis of telemetry data transmitted from the satellite, the generated heat amount conditions, and the temperature environment conditions; an analysis unit for performing thermal analysis for computing a temperature inside the satellite on the basis of the thermal analysis conditions; a temperature distribution data generation unit for generating temperature distribution data of part or all of the satellite in a three-dimensional display format on the basis of the temperature values obtained by the thermal analysis; and a display unit for displaying the temperature distribution data.

Effect of the Invention

In the present invention, the thermal analysis unit creates temperature distribution data for three-dimensional display. This allows the operator of the satellite to easily grasp the temperature state inside the satellite without bothering the operator of the satellite and can also contribute to the early discovery of, for example, temperature anomaly inside the satellite.

EXPLANATIONS OF LETTERS OR NUMERALS

Figure 1:
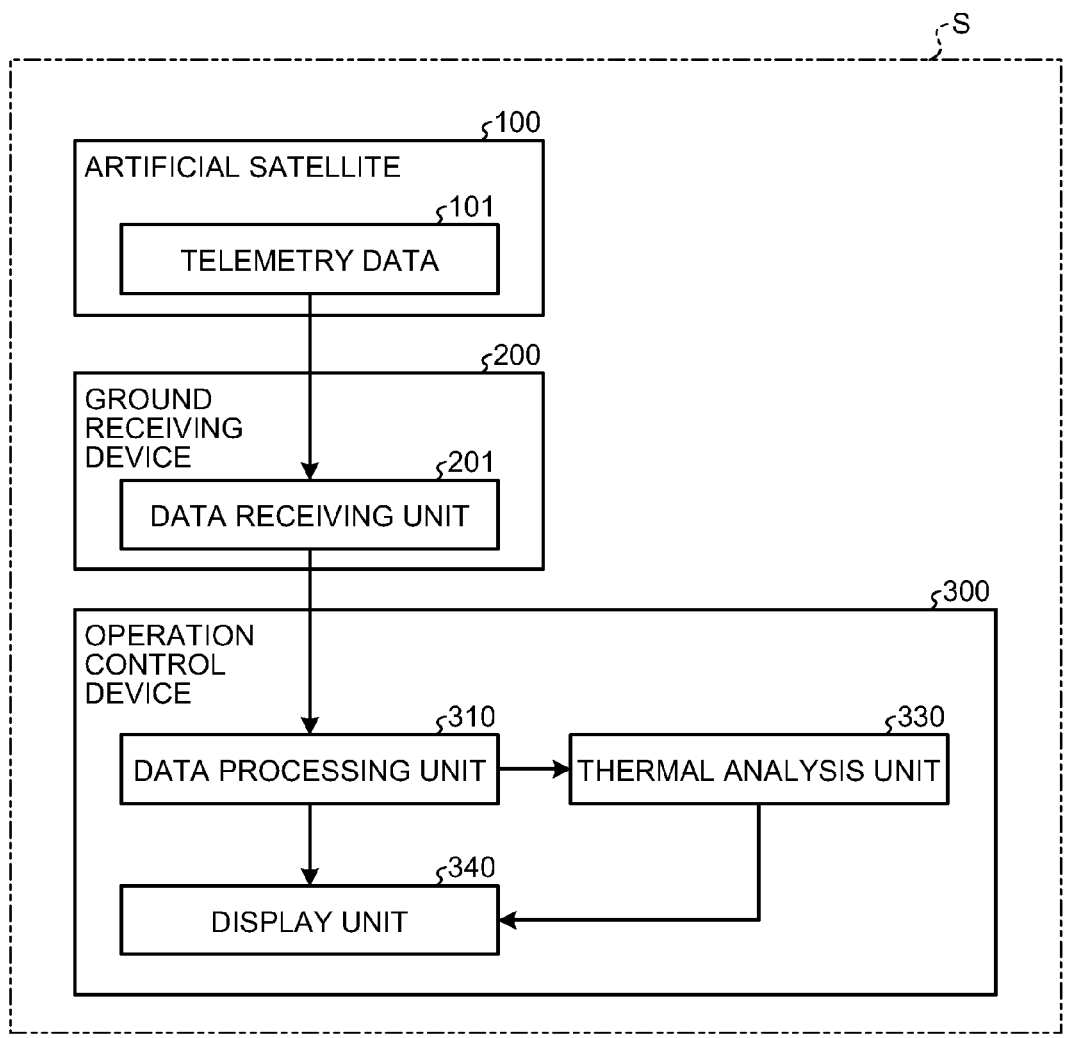
FIG. 1 is a diagram illustrating the schematic structure of a control system configured to include an operation control device according to an embodiment of the present invention.

S Operation control system
100 Satellite
101 Telemetry data
200 Terrestrial receiving device
201 Data receiving unit
300 Operation control device
310 Data processing unit
311 Satellite device operating-mode telemetry data
312 Satellite orbital position telemetry data
313 Satellite attitude telemetry data
314 Satellite temperature telemetry data
330 Thermal analysis unit
331 Database
332 Thermal analysis condition generation unit
333 Analysis unit
334 Thermal analysis condition optimization unit
335 Temperature distribution data generation unit
340 Display unit

BEST MODE(S) FOR CARRYING OUT THE INVENTION

An embodiment of an operation control device according to the present invention will next be described in detail with reference to the drawings. However, the present invention is not limited to the embodiment.

First Embodiment

Figure 2:
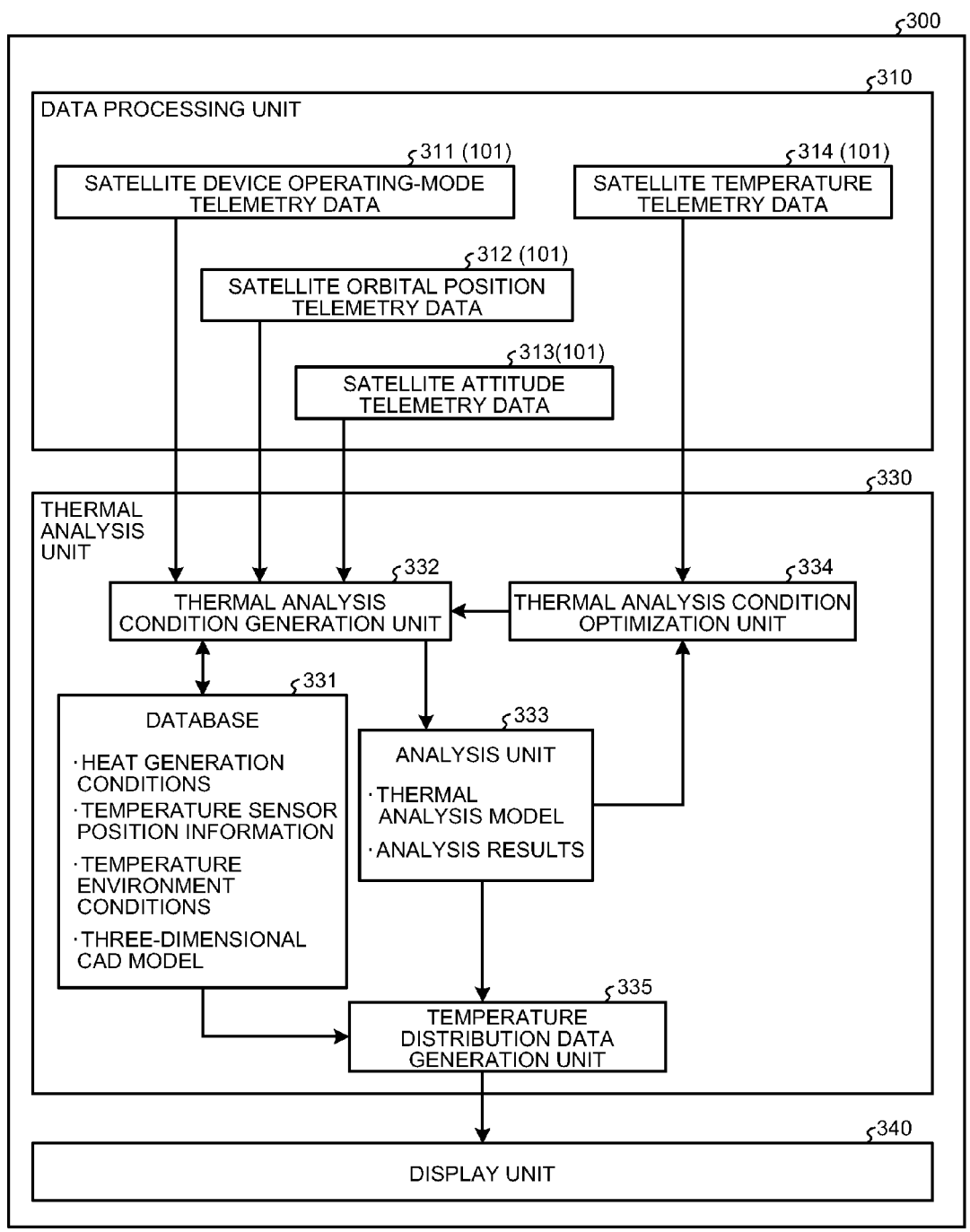
FIG. 2 is a diagram illustrating the schematic structure of the operation control device.

FIG. 1 shows the schematic structure of a control system configured to include an operation control device according to a first embodiment of the present invention. FIG. 2 shows the schematic structure of the operation control device. The control system S is configured to include a satellite 100, a terrestrial receiving device 200, and an operation control device 300.

The satellite 100 transmits telemetry data 101 to the terrestrial receiving device 200. The telemetry data 101 transmitted from the satellite 100 includes satellite device operating-mode telemetry data 311 that represents the operating states and mode states of various devices provided in the satellite 100, satellite orbital position telemetry data 312 that represents the orbital position of the satellite 100, satellite attitude telemetry data 313 that represents the attitude of the satellite 100, and satellite temperature telemetry data 314 that represents the temperatures actually measured by temperature sensors, such as thermocouples, provided in the satellite 100.

The telemetry data 101 includes raw values outputted from the various devices provided in the satellite 100. For example, the satellite temperature telemetry data 314 includes potential differences measured by the thermocouples and the like. The satellite device operating-mode telemetry data 311 includes numerical data such as "0" and "1" for indicating ON/OFF of the devices, and these values are used as the telemetry data 101. These data values are converted to, for example, values easily recognizable to the operator of the satellite by a data processing unit 310 described later.

The terrestrial receiving device 200 includes a data receiving unit 201 for receiving the telemetry data 101 transmitted from the satellite 100. The telemetry data 101 received by the data receiving unit 201 is transmitted to the operation control device 300.

The operation control device 300 includes the data processing unit 310, a thermal analysis unit 330, and a display unit 340. The data processing unit 310 converts the received telemetry data 101 to values easily recognizable to the operator of the satellite. For example, potential differences measured by the thermocouples in the satellite temperature telemetry data 314 are converted to temperatures. For the satellite device operating-mode telemetry data 311, "0" is converted to a character string "OFF," and "1" is converted to a character string "ON." The satellite attitude telemetry data 313 is converted to values representing the angles of the satellite 100, and the converted values are displayed on the display unit 340. The data processing unit 310 displays the temperatures and character strings converted from the telemetry data on the display unit 340.

The data processing unit 310 passes the satellite device operating-mode telemetry data 311, the satellite orbital position telemetry data 312, and the satellite attitude telemetry data 313 included in the telemetry data 101 to a thermal analysis condition generation unit 332 described later and passes the temperature telemetry data 314 to a thermal analysis condition optimization unit 334 described later.

The thermal analysis unit 330 includes a database 331, the thermal analysis condition generation unit 332, an analysis unit 333, the thermal analysis condition optimization unit 334, and a temperature distribution data generation unit 335.

The database 331 stores information necessary for the temperature analysis and generation of three-dimensional temperature distribution data that are performed in the thermal analysis unit 330. The database 331 also stores generated heat amount conditions based on the ON/OFF states etc. of the various devices provided in the satellite 100. The database 331 also stores temperature environment conditions based on the orbital position and attitude of the satellite 100. The database 331 stores temperature sensor position information that represents the positions of the temperature sensors disposed in the satellite 100 and a three-dimensional CAD model of the satellite 100.

The thermal analysis condition generation unit 332 has a function of generating the thermal analysis conditions of the satellite 100 from the satellite device operating-mode telemetry data 311, the satellite orbital position telemetry data 312, and the satellite attitude telemetry data 313 included in the telemetry data 101 using the generated heat amount conditions and temperature environment conditions stored in the database 331.

The analysis unit 333 performs temperature analysis based on the thermal analysis conditions generated by the thermal analysis condition generation unit 332 to compute the temperature values inside the satellite 100. The analysis unit 333 passes the temperature values obtained by the temperature analysis to the thermal analysis condition optimization unit 334. A thermal analysis model is pre-inputted to the analysis unit 333. The thermal analysis model is a three-dimensional model from which the details of the shape of the satellite have been omitted. The thermal analysis model includes fixed elements for heat conduction, elements for fluid convection, and radiation and allows three-dimensional steady/non-steady thermal analysis. Any modeling method can be used to construct the thermal analysis model.

The thermal analysis condition optimization unit 334 compares the temperature values obtained by the temperature analysis at elements (fixed positions) corresponding to the placement positions of the temperature sensors with the temperature values actually measured by the temperature sensors (the temperature values obtained from the temperature telemetry data 314) and then computes the differences between these temperature values. If the differences between the temperature values obtained by the temperature analysis and the actually measured temperature values are not equal to or less than a predetermined value, the thermal analysis condition optimization unit 334 instructs the thermal analysis condition generation unit 332 to modify the thermal analysis conditions. When the thermal analysis conditions are modified, the thermal analysis condition optimization unit 334 also modifies the generated heat amount conditions and the temperature environment conditions stored in the database 331.

In the thermal analysis unit 330, modifications to the thermal analysis conditions, thermal analysis, and comparison between the temperature values computed by the thermal analysis and the actually measured temperature values are repeated until the differences between the temperature values obtained by the thermal analysis and the actually measured temperature values become the predetermined value or less. In this manner, the reliability of the temperature values obtained by the temperature analysis at elements at which temperature values which cannot be actually measured can be also improved.

The temperature distribution data generation unit 335 displays the temperature values obtained by the temperature analysis on the three-dimensional CAD model of the satellite 100 that is stored in the database 331, so that the data of the temperature distribution inside the entire satellite 100 in a three-dimensional display format (hereinafter referred to as three-dimensional temperature distribution data) is generated in real time. When the three-dimensional temperature distribution data is generated, the temperature distribution data generation unit 335 embeds the temperature sensor position information in the three-dimensional CAD model. The temperature distribution data generation unit 335 can generate the three-dimensional temperature distribution data of the entire satellite 100 and can also generate the three-dimensional temperature distribution data of part of the satellite 100.

Figure 3:
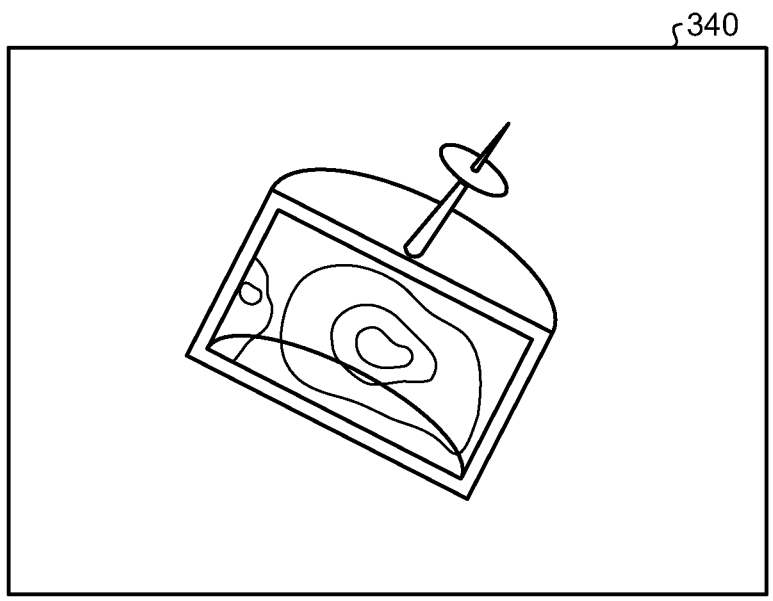
FIG. 3 is a diagram illustrating three-dimensional temperature distribution data displayed on a display unit.

The display unit 340 is used to display the three-dimensional temperature distribution data and other data, and a liquid crystal display, for example, is used for the display unit 340. FIG. 3 shows three-dimensional temperature distribution data displayed on the display unit 340.

As described above, the operation control device 300 according to the present embodiment includes the temperature distribution data generation unit 335 that generates three-dimensional temperature distribution data in real time. Therefore, the operator of the satellite can check the temperature distribution inside the satellite 100 in real time.

The three-dimensional temperature distribution data is generated with the temperature sensor position information embedded in the three-dimensional CAD model. Therefore, for example, by clicking a temperature sensor placement point on the three-dimensional temperature distribution data, an actually measured value associated with the placement point through the temperature sensor position information can be also retrieved and displayed. In this manner, both the temperature distribution and the actually measured values can be easily grasped. The actually measured values obtained from the satellite temperature telemetry data 314 may be directly displayed on the three-dimensional temperature distribution data.

Since the thermal analysis conditions are repeatedly modified until the differences between the temperature values obtained by the temperature analysis performed on the analysis unit 333 and the actually measured temperature values become the predetermined value, the validity of the thermal analysis model can be improved. The generated heat amount conditions and the temperature environment conditions stored in the database 331 are also modified, and this allows immediate feedback on the construction of a thermal analysis model for the development of a future satellite.

In the present embodiment, the temperature distribution data generation unit 335 displays the temperature values obtained by the temperature analysis on the three-dimensional CAD model to generate three-dimensional temperature distribution data. However, three-dimensional temperature distribution data may be generated by displaying the temperature values obtained by the temperature analysis on the thermal analysis model. The three-dimensional CAD model is design data and represents the detailed shape of the satellite 100.

In the present embodiment, three-dimensional temperature distribution data is generated in real time. However, old telemetry data is also allowed to be used to generate three-dimensional temperature distribution data. This allows comparison with old three-dimensional temperature distribution data.

The temperature distribution data generation unit 335 may generate the three-dimensional temperature distribution data of part of the satellite 100.

Generally, the operator of a satellite monitors only numerical information such as actually measured values obtained from telemetry data. Therefore, for example, a call button for displaying three-dimensional temperature distribution data may be configured to be disposed on part of the screen on which the numerical information is displayed so that the operator of the satellite can view the three-dimensional temperature distribution data immediately. The device can be configured such that, when a list showing the values actually measured by the temperature sensors is partially clicked, partial three-dimensional temperature distribution data for the area corresponding to the clicked temperature sensor out of the entire three-dimensional temperature distribution data is generated by the temperature distribution data generation unit 335 and enlarged on the display.

INDUSTRIAL APPLICABILITY

As described above, the operation control device according to the present invention is useful for the control system of a satellite and is particularly suitable for the grasp of the temperature state inside the satellite.

The invention claimed is:

1. An operation control device, comprising:

a database for storing generated heat amount conditions of a device provided in a satellite and temperature environment conditions based on an orbital position and attitude of the satellite;

a thermal analysis condition generation unit for generating thermal analysis conditions on the basis of telemetry data that represents temperatures actually measured by sensors provided in the satellite and is transmitted from the satellite, the generated heat amount conditions, and the temperature environment conditions;

an analysis unit for performing thermal analysis for computing a temperature inside the satellite on the basis of the thermal analysis conditions;

a temperature distribution data generation unit for generating temperature distribution data of part or all inside the satellite in a three-dimensional display format on the basis of the temperature values obtained by the thermal analysis; and a display unit for displaying the temperature distribution data.

2. The operation control device according to claim 1, wherein the operation control device further includes a thermal analysis condition optimization unit for computing temperature differences between the temperature values obtained by the thermal analysis at fixed positions corresponding to placement positions of the temperature sensors and temperature values actually measured inside the satellite and contained in the telemetry data and instructing the thermal analysis condition generation unit to modify the thermal analysis conditions if the temperature differences are greater than a predetermined value.

3. The operation control device according to claim 1, wherein the temperature distribution data generation unit generates the temperature distribution data by displaying the temperature values obtained by the thermal analysis on a three-dimensional CAD model of the satellite.

4. The operation control device according to claim 1, wherein the analysis unit stores a three-dimensional thermal analysis model of the satellite, and the temperature distribution data generation unit generates the temperature distribution data by displaying the temperature values obtained by the thermal analysis on the three-dimensional thermal analysis model.

5. The operation control device according to claim 3, wherein the temperature distribution data generation unit embeds temperature sensor position information that represents the placement positions of the temperature sensors in the three-dimensional CAD model when the three-dimensional temperature distribution data is generated, and displays the temperature values actually measured and associated with the placement positions through the temperature sensor position information on the temperature distribution data.

6. The operation control device according to claim 4, wherein the temperature distribution data generation unit embeds temperature sensor position information that represents the placement positions of the temperature sensors in the three-dimensional thermal analysis model when the three-dimensional temperature distribution data is generated, and displays the temperature values actually measured and associated with the placement positions through the temperature sensor position information on the temperature distribution data.

* * * * *